US011823117B2

(12) United States Patent
Kaiser et al.

(10) Patent No.: US 11,823,117 B2
(45) Date of Patent: Nov. 21, 2023

(54) DELIVERY MODE OPTIMIZATION IN SUPPLY CHAIN ARCHITECTURE

(71) Applicant: Target Brands, Inc., Minneapolis, MN (US)

(72) Inventors: Nicholas Kaiser, Minnetonka, MN (US); Hilary Barr, Minneapolis, MN (US); Elise Chianelli, Brooklyn Park, MN (US); Daniel John Chamberlain, Minneapolis, MN (US); Gavin Myers, Minneapolis, MN (US); Constantin Tanno, Minneapolis, MN (US); Kristofer Hjelmeland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 322 days.

(21) Appl. No.: 16/206,781

(22) Filed: Nov. 30, 2018

(65) Prior Publication Data

US 2020/0175472 A1 Jun. 4, 2020

(51) Int. Cl.
*G06Q 10/08* (2023.01)
*G06Q 10/0835* (2023.01)
*G06Q 30/0601* (2023.01)
*G06Q 10/0834* (2023.01)

(52) U.S. Cl.
CPC ..... *G06Q 10/0835* (2013.01); *G06Q 10/0834* (2013.01); *G06Q 30/0641* (2013.01)

(58) Field of Classification Search
CPC ........... G06Q 10/0835; G06Q 10/0834; G06Q 30/0641

USPC ........................................................ 705/337
See application file for complete search history.

(56) References Cited

U.S. PATENT DOCUMENTS

| 5,265,006 A | 11/1993 | Asthana et al. |
| 6,571,213 B1 | 5/2003 | Altendahl et al. |
| 6,615,104 B2 | 9/2003 | England et al. |

(Continued)

OTHER PUBLICATIONS

Stecke et al., Production and Transportation Integration for a Make-to-Order Manufacturing Company with Commit-to-Delivery Business Mode, Manufacturing & Service Operations Management, vol. 9, No. 2, Apr. 1, 2007, pp. 1 thru 3, https://pubsonline.informs.org/doi/10.1287/msom.1060.0138 (Year: 2007).*

(Continued)

*Primary Examiner* — Resha Desai
*Assistant Examiner* — Ismail A Manejwala
(74) *Attorney, Agent, or Firm* — Merchant and Gould, PC

(57) ABSTRACT

Methods and systems are described for optimizing delivery modes used to transport items to a customer. A delivery optimization system includes an online ordering system, a delivery mode optimizer, an order allocator, and a ship label and manifest generator. The delivery mode optimizer selects an optimal shipping mode based on information received from carriers. The lowest cost option to deliver the goods to the destination by a promised delivery date is selected at the time the order is received. A shipping node is selected that can supply the items needed to fulfill the order within the desired timeframe. The delivery mode is reevaluated after the order is prepared for shipment to determine if available shipping options have changed.

22 Claims, 7 Drawing Sheets

(56) References Cited

U.S. PATENT DOCUMENTS

| | | | |
|---|---|---|---|
| 7,979,359 B1* | 7/2011 | Young | G06Q 10/06 |
| | | | 705/332 |
| 8,326,679 B1 | 12/2012 | Rowe et al. | |
| 8,401,957 B2 | 3/2013 | Forlai | |
| 8,407,110 B1 | 3/2013 | Joseph et al. | |
| 8,504,413 B1 | 8/2013 | Rowe et al. | |
| 8,560,461 B1 | 10/2013 | Tian et al. | |
| 9,142,035 B1 | 9/2015 | Rotman et al. | |
| 9,174,758 B1* | 11/2015 | Rowley | B65B 5/00 |
| 10,706,384 B1* | 7/2020 | Bolton | G06Q 10/08355 |
| 10,789,566 B1* | 9/2020 | Masterman | G06Q 10/083 |
| 2002/0032612 A1* | 3/2002 | Williams | G06Q 30/0601 |
| | | | 705/26.1 |
| 2003/0020011 A1 | 1/2003 | Anderson et al. | |
| 2005/0055260 A1* | 3/2005 | Yamamoto | G06Q 10/087 |
| | | | 705/7.26 |
| 2006/0136237 A1 | 6/2006 | Spiegel et al. | |
| 2011/0071954 A1* | 3/2011 | McCall | G06Q 10/083 |
| | | | 705/337 |
| 2014/0207700 A1* | 7/2014 | Boss | G06Q 90/00 |
| | | | 705/330 |
| 2015/0073936 A1* | 3/2015 | Peterson | G06Q 10/0835 |
| | | | 705/26.9 |
| 2016/0148155 A1* | 5/2016 | Barahona | G06Q 40/08 |
| | | | 705/5 |
| 2017/0323250 A1* | 11/2017 | Lindbo | G06Q 10/08345 |
| 2018/0181904 A1* | 6/2018 | Wilkinson | G06Q 10/083 |
| 2019/0147522 A1* | 5/2019 | Susser | G06Q 10/083 |
| | | | 705/26.8 |

OTHER PUBLICATIONS

Jeonghye Choi, Preference Minorities and the Internet, Aug. 1, 2011, Journal of Marketing Research (Year: 2011).*

* cited by examiner

602

Incoming Order #497682058

Order Date: 7/21/18
Customer Zip Code: 55410
Delivery Promise Date: 7/30/18
Items:
    Blue Car Seat    1
    Infant Diapers    3
    Floppy Bunny    1

604

Initial Shipping Mode and Node Allocation:

Node A: UPS Ground
    Blue Car Seat    1
    Infant Diapers    3
    Floppy Bunny    1

606

Order #497682058 Prepared
Prep Date: 7/28/18
Order Date: 7/21/18
Customer Zip Code: 55410
Delivery Promise Date: 7/30/18
Items:
    Blue Car Seat    1
    Infant Diapers    3
    Floppy Bunny    1

608

Optimal Shipping Mode:

Node A: UPS Next Day Air
    Blue Car Seat    1
    Infant Diapers    3
    Floppy Bunny    1

FIG. 6

DELIVERY MODE OPTIMIZATION IN SUPPLY CHAIN ARCHITECTURE

TECHNICAL FIELD

The present disclosure is directed to methods and systems for optimizing delivery modes. More particularly, the present disclosure describes a system architecture for selecting an optimal delivery mode for transporting items within a supply chain.

BACKGROUND

There are a multitude of options for shipping goods from an origin to a destination. Efficient supply chain management requires leveraging the fastest, cheapest methods of shipping goods to a destination. Many factors such as cost, speed, delivery schedules, and service options must be taken into account to determine the best shipping option. In instances where a delivery must take place within a given timeframe, cost considerations may give way to speed considerations.

Existing methods of selecting shipping modes analyze shipping factors and make a determination of which carrier and service option will be used for a delivery at the time an order is placed for goods. However, delivery schedules can change due to delays or orders can be prepared faster than expected. The optimal delivery mode may change between the time an order is placed and when the order is ready to be shipped. A method of determining an optimal delivery mode for shipping items to account for changes that take place during order preparation is needed.

SUMMARY

In general terms, the present disclosure relates to methods and systems for optimizing delivery modes for transporting items between nodes of a supply chain. In some aspects, the delivery modes are optimized to ultimately deliver items ordered by a customer to the customer's location. The delivery modes are updated at the time the order is prepared for shipment. The optimal delivery mode could change due to differences between the expected and actual order preparation time, delivery schedules, and availability of bulk shipping discounts. Optimal delivery modes provide for transportation of items to a customer within a promised timeframe at the lowest available price point.

According to the present disclosure, a delivery optimization system is usable to select an optimal carrier and service for transporting items. The system includes a carrier data store configured to receive and store carrier information including carrier rates, carrier services, carrier zones, carrier time in transit tables, carrier calendars, and origin/destination pair alignments for each node within an enterprise supply chain. The system also includes an online ordering system configured to receive and process orders from customer computing devices. A delivery mode optimizer is configured to evaluate carrier options by node for each of one or more nodes within the enterprise supply chain capable of fulfilling the order. Based on shipping cost and shipping time, the delivery mode optimizer generates a plurality of possible initial optimal shipping modes for each of the one or more nodes. The system also includes an order allocator configured to allocate the order to a node within the supply chain based at least in part on the initial optimal shipping modes, item availability, success rates, and shipping schedules. After the order is prepared for shipment at the node to which the order is allocated, the delivery mode optimizers receives from the node a confirmation of order preparation which includes a request to reevaluate carrier options. Based on a time after the order is prepared for shipment, a final optimal shipping mode is assigned by the delivery mode optimizer to the order that fulfills the order within a predetermined time and at minimized cost. A ship label and manifest generator generates a ship label consistent with the final optimal shipping mode and sends the ship label to the node to which the order is allocated. The ship label and manifest generator also generates a manifest consistent with the order and sends the manifest to the a carrier consistent with the final optimal shipping mode.

At least one aspect of the present disclosure is directed to a method of optimizing delivery of items between nodes of a supply chain. Carrier information is received and stored. An order from a customer is received for one or more items. Carrier options are evaluated by node and an initial optimal shipping mode is assigned to the order. The order is assigned to one or more nodes consistent with the initial optimal shipping mode. A confirmation of order preparation is received from the one or more nodes and carrier options are reevaluated. A final optimal shipping mode is assigned to the order and one or more ship labels and manifests are generated consistent with the final optimal shipping mode. The ship labels are sent to the one or more nodes and the manifests are sent to one or more carriers consistent with the final optimal shipping mode.

In another aspect, a computer implemented method of optimizes delivery modes for one or more items to be delivered to a customer. The method involves receiving and storing carrier information in a carrier data store. The carrier information can include carrier rates, carrier services, carrier zones, carrier time in transit tables, carrier calendars, and origin/destination pair alignments for each node within an enterprise supply chain. A customer user interface receives an order from a customer for one or more items to be delivered to a customer address. The order is processed at an online ordering system. Carrier options are evaluated at a delivery mode optimizer by applying one or more rules to the carrier information. The delivery mode optimizer assigns one or more initial optimal shipping modes to the order, the initial optimal shipping modes specifying a carrier and service type. An order allocator then allocates the order to one or more nodes consistent with the initial optimal shipping modes based on item availability at the nodes, success rates of the nodes, and shipping schedules for the nodes The delivery mode optimizer receives a confirmation from the one or more nodes of order preparation which includes a request to reevaluate the optimal shipping mode. Carrier options are reevaluated based on the time that the order is prepared and a final optimal shipping mode is assigned to the order. The final optimal shipping mode is communicated to a ship label and manifest generator which generates a ship label and manifest. The ship label is sent to the one or more nodes and the manifest is sent to the one or more carriers associated with the final optimal shipping mode.

BRIEF DESCRIPTION OF THE DRAWINGS

FIG. 6 illustrates example views of a graphical user interface.

DETAILED DESCRIPTION

Figure 1:
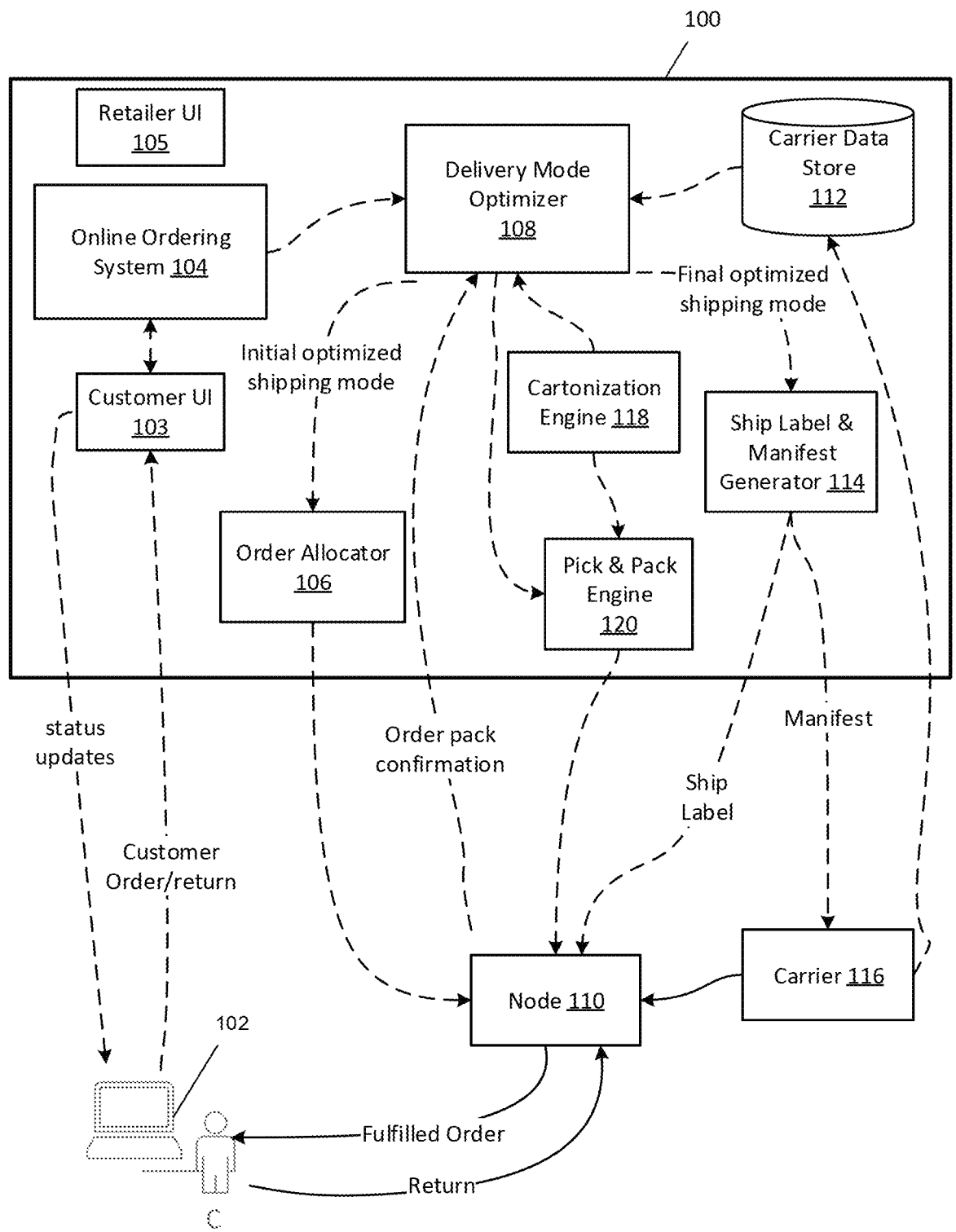
FIG. 1 illustrates a schematic diagram of an example delivery optimization system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The term "node" according to embodiments of this disclosure refers to a location within a supply chain. In some instances, the node could be a location from which shipments originate. In other instances, a node is a destination. The "node" can refer to a customer delivery address or other destination that is not considered to be within the retail enterprise. Nodes within a retail enterprise can include warehouses, retail stores, and other locations where items are stored. In some embodiments, shipments of packages including one or more items being purchased are transported from store or flow center nodes to customers. In some embodiments, packages including one or more items to be returned to a retailer are transported from customer nodes to store or flow center nodes.

The term "carrier" refers to a business providing shipping services from an origin to a destination. The carrier can operate various vehicles such as trucks, vans, airplanes, and ships. In the embodiments described, the carrier transports packages from a node to a customer. Carriers may offer various levels and speeds of service for transporting packages. For example, carriers can provide overnight service via air (airplane) or ground service which could take multiple days. Typically, faster services are more costly. In some cases, carriers offer bulk or volume discounts if enough packages are shipped from one node.

The term "carrier" encompasses businesses that provide shipping services on a contract basis, crowd-sourced delivery services, and shipping services provided in-house. The contract basis services could be operated by a delivery company that operates nationally, regionally, or locally. The contract basis services could be provided by employees, freelance workers, or independent operators. Crowd-sourced delivery services can be managed by a company that also manages a fleet of delivery workers that perform deliveries on an individual contract basis. The in-house shipping services could be a service within a retail enterprise that employs delivery workers to complete local deliveries or could be a program within a retail enterprise that incentivizes employees of the retail enterprise to perform some deliveries while traveling to or from their place of work at the retail enterprise.

FIG. 1 illustrates a schematic diagram 100 of an example delivery optimization system. A customer computing device 102 receives input from a customer C. In some embodiments, the input is received through a customer user interface (UI) 103 configured to display options for ordering items for delivery. In some embodiments, the customer input places an order for one or more items to be delivered to the customer from a retailer. The customer order is received by the online ordering system 104 where it is processed for fulfillment. In some embodiments, the customer input places a request for one or more items to be returned to the retailer from the customer. The customer may desire an exchange or refund and needs the items to be transported back to the retailer. The return request is received by the online ordering system 104 where it is processed for a refund or exchange.

The online ordering system 104 operates to receive and process orders received from customers. In some embodiments, the online ordering system 104 can receive orders from multiple sources such as orders placed online from a retail store as well as orders placed by customers online through a website. The online ordering system 104 forwards order information to the delivery mode optimizer 108. The order information can include identification of items, quantity of items, requested delivery speed, and delivery address.

In some embodiments, the online ordering system 104 also operates to process return requests from customers. In some instances, the customer may wish to return an item for a refund. There are various options for how the item can be transported from the customer C back to the retailer.

The delivery mode optimizer 108 operates to evaluate carrier options to select an optimal shipping mode. The delivery mode optimizer 108 receives customer orders for one or more items from the online ordering system 104. The delivery mode optimizer 108 processes the orders to determine a delivery location for the order and the items requested in the order. In some embodiments, the zip code of the delivery location is determined.

The delivery mode optimizer 108 accesses carrier information from the carrier data store 112. The carrier information is utilized to evaluate carrier options for delivering the ordered items to the delivery location. The carrier information is analyzed to determine the lowest cost carrier and type of delivery service that can be utilized to deliver an order to a customer by a promised delivery date.

In some embodiments, the delivery mode optimizer 108 can also access information provided by a cartonization engine 118. This information includes dimensions and weights of various packages. This information can be utilized to calculate costs of shipping based on weight and/or volume.

In some embodiments, the delivery mode optimizer 108 determines optimal shipping modes for transporting returned items from customers back to a node within the retail enterprise supply chain. This applies to any items that the customer does not return to a store themselves and to any items that the retailer determines are worth the cost of transporting back to a retail store or flow center. The delivery mode optimizer 108 evaluates carrier options for transporting the items to be returned from a customer's location back to a particular node within the retail supply chain.

The delivery mode optimizer then assigns an initial optimal shipping mode to the order or return. This initial optimal shipping mode is communicated to the order allocator 106.

Figure 3:
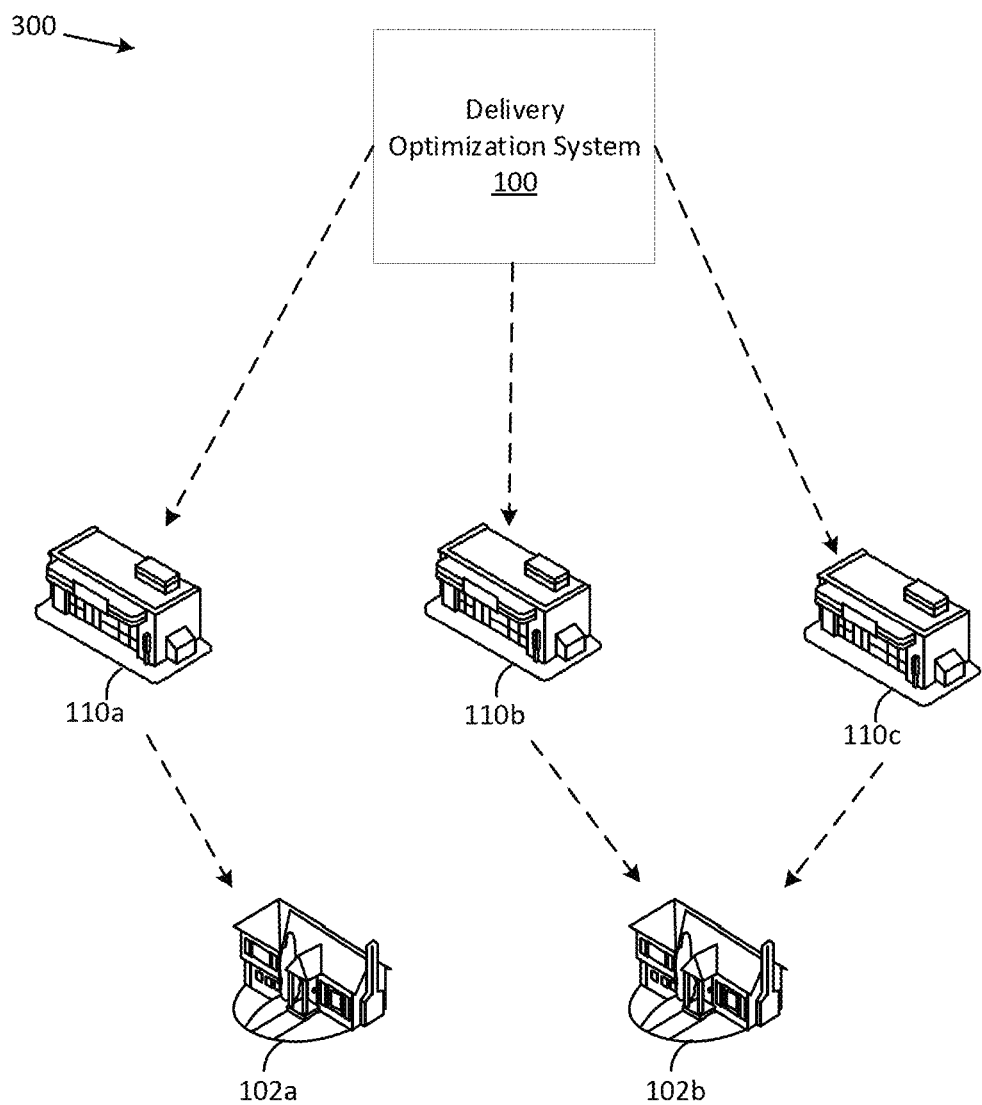
FIG. 3 illustrates a schematic diagram of an example supply chain for a retail enterprise

The carrier data store 112 and delivery mode optimizer 108 are described in further detail in FIG. 3.

The order allocator 106 operates to allocate orders to nodes within a supply chain to fulfill the orders. Nodes can include receiving centers, flow centers, warehouses, stock rooms attached to retail stores, and in-store inventory of retail stores. In some instances, an order can be fulfilled at a single node. In other instances, the order may need to be filled using items from multiple nodes. One example of an order allocator is described in U.S. patent application Ser. No. 16/160,648 filed Oct. 15, 2018, which is herein incorporated by reference in its entirety.

The order allocator 106 selects stores, warehouses, etc. based on shipping schedules of carriers. Generally, a regularly scheduled pick-up time exists for each of a plurality of carriers for a given node. If two different nodes have the same items in stock that are needed to fulfill an order but a first node has a shipping schedule that will go out sooner than a second node, the first node will be selected over the second one because the items will be shipped out sooner and, if the node is as close or closer to the customer than the second node, the items of the order will arrive at the customer's address more quickly.

The order allocator 106 also selects nodes to fulfill orders based on available inventory. For example, if an order includes items A, B, and C, the order allocator 106 could assign the order to one node to fulfill the entire order if that node has the requested number of each of items A, B, and C in stock. If a single node does not have all requested items in stock, an order could be assigned to two or more nodes for fulfillment.

Further, even if a single node has all items in stock to fulfill an order, that node may be too far away from a customer for shipping from the node to the customer to be timely. Two separate nodes located closer to the zip code of the delivery address may be selected to fulfill an order. For example, node 1 could be assigned to supply items A and B and node 2 could be assigned to supply item C.

The order allocator 106 can also consider success rates of the nodes when assigning orders to nodes. The success rates indicate how often orders are correctly fulfilled at a node in the requested timeframe. Success rates can take into account accuracy of order fulfillment. Accuracy includes providing the correct items in the correct amounts for a given order. Package quality can also be taken into account. Package quality is considered good if the items of the order arrive to the customer in good condition. If the items are damaged, the package quality is considered bad.

Another factor is timeliness. If the ordered items are packaged and ready for shipment in the estimated timeframe or less, the timeliness is considered good. If a node consistently prepares orders in an amount of time that is longer than expected, the timeliness is bad. All of these quality factors can be taken into account when allocating orders to a given node.

The order allocator also considers other data such as capacity, throughput, and building in-by calendars to select and allocate orders to nodes that comply with delivery promise dates.

Once the order allocator 106 has allocated orders to nodes, the assignments are communicated to the nodes. In the example of FIG. 1, only one node 110 is depicted. However, two, three, four, or more nodes may be utilized to handle a single order. The node or nodes receive information about the items that are to be packed for a given order. If a node is assigned to provide a subset of items in a given order, the assignment will indicate such and specify which items the node is required to provide for that order. The assignments include a description and quantity of each item that is to be included for a given order.

At the node 110, the order is picked and packed. The items in the order are selected from inventory storage and packaged for shipment. In instances where more than one item is packed for a single order, the different items may be packaged into the same container. In some instances, only part of the ordered items are packed at one node and other items are packed at a different node.

The pick and pack engine 120 manages information regarding orders that need to be prepared for shipment. The pick and pack engine 120 can access information from the delivery mode optimizer 108 to determine how orders should be prioritized for pick and pack. For example, if an order could be prepared for shipment in time to receive a bulk discount, that order could be expedited for the pick and pack process. A message will be sent to a user computing device at the node 110 to notify employees that the order should be prioritized.

The pick and pack engine 120 can also access information from the cartonization engine 118 to inform employees of recommended packaging for items in an order. The cartonization engine 118 also provides information to the delivery mode optimizer 108 regarding the dimensions and weights of packages for the purposes of calculating shipping costs.

Once the order is ready for shipment, the node 110 communicates a confirmation back to the delivery mode optimizer 108. An employee that packaged the items for shipment could submit the confirmation using a computing device at the node. In some examples, a barcode corresponding to the order could be affixed to the one or more packages containing items for the order and the employee could scan the barcode and the computing device would submit the corresponding information associated with the barcode to the delivery mode optimizer 108.

In some embodiments, the cartonization engine 118 is utilized to determine the proper packaging to ship items. The cartonization engine 118 operates to improve the manner in which cartonization occurs for different types of products. For example, for each item, item characteristics are tracked including dimensions. Item attributes are used to determine if a box, bag, mailer, specialty box, or gift is selected. Based on these item characteristics, a package of appropriate size and type is selected.

The cartonization engine 118 can operate to generate a user interface to employees to aid in selecting package size and type for packing orders. The user interface can also illustrate how to place items into a particular package to maximize space within the package.

In some examples, the confirmation is also communicated to the online ordering system 104. The order status could be updated at the online ordering system 104. In some examples, the order status can be viewed using a GUI for a customer (103) or a retailer employee (105). An example GUI is described in FIGS. 6 and 7.

The delivery mode optimizer 108 once again determines an optimal shipping mode for the order once the confirmation is received. Because shipping schedules could change or the timing of the order preparation could be different from that predicted at the time the order was received, the delivery mode optimizer 108 reevaluates the optimal shipping mode for delivering the completed order to the customer. The delivery mode optimizer 108 accesses updates to carrier information and determines the optimal delivery mode for sending the ordered items to eh customer.

The final optimal delivery mode may differ from the initial optimal delivery mode because of different reasons. One is that actual fulfillment of the order took longer to process than expected. The volume of packaged orders may be different than anticipated. Some carriers have volume requirements and must hit a threshold level to achieve a lower shipment rate. If the volume of packages does not reach the threshold, the costs may be higher than expected to deliver the orders. In such instances, it may be cheaper to use a different carrier than initially planned.

In some instances, the order could be prepared more quickly and a slower shipping method could be used to complete the order at a lower cost to the retailer. In other examples, there may be a delay in preparing the order for shipment. Such delays could cause an order to miss the cut off time for a particular carrier to pick up a shipment. An expedited shipping mode may be required to complete the order delivery to the customer by the promised time. In yet other examples, a first shipping method may be selected initially, but delays with the carrier may change the shipping schedule on the day that the package is to be picked up at the node. In such instances, a different carrier may be selected because that carrier will be making a pick up at the node next.

The final optimized shipping mode is communicated to the ship label and manifest generator 114. The final optimized shipping mode includes a carrier and a shipping speed. The ship label and manifest generator 114 receives the carrier and shipping speed information from the delivery mode optimizer 108. The ship label and manifest generator 114 also receives information about the items in the order from the online ordering system 104. The information about the packages is used to populate the manifest.

The ship label is sent to the node 110 or nodes from the ship label and manifest generator 114. The ship label can be physically sent to the node 110. In other aspects, the ship label is electronically sent to the node 110. The ship label is then affixed to the package or packages containing items for the order. In the case of electronic ship labels, a printer at the node may be utilized to generate a physical label for the packages. A copy of the ship label may be sent to the carrier assigned to the order as well.

Once the ship label is printed at the node, it is applied to a package or carton containing items for the order. The shipping label will be used by the carrier to confirm the delivery address. In some embodiments, the shipping label also operates to provide information about particular items within a package such as lithium or hazmat materials. The ship label can be scanned at one or more points of the delivery process to send updates back to the online ordering system 104. These updates can be viewed through either the customer UI 103 or the retailer UI 105.

The manifest is sent to the carrier or carriers assigned to deliver the order from the node or nodes to the customer. The carrier can use the manifest to confirm that an order is complete and ready for shipment. The manifest documents all of the packages that will be included in the same truckload for shipment.

Once the package or packages containing items from the customer's order are picked up by the carrier, they are transported to the customer. The transportation of the packages could take a route that stops multiple times before arriving at the customer's address. In some instances, the packages could be transferred from one vehicle to another. The packages could pass through processing centers before being shipped to the final customer address. In some instances, if the packages need to arrive quickly, the carrier might take them directly from the node to the customer address.

The carrier may scan the ship label upon delivery of the order to the customer. The scan gathers information about the order and sends a confirmation to the online ordering system 114. This information is used to determine if the order was delivered within the promised timeframe. This information can be utilized for planning future order deliveries and determining future optimal shipping modes.

Figure 2:
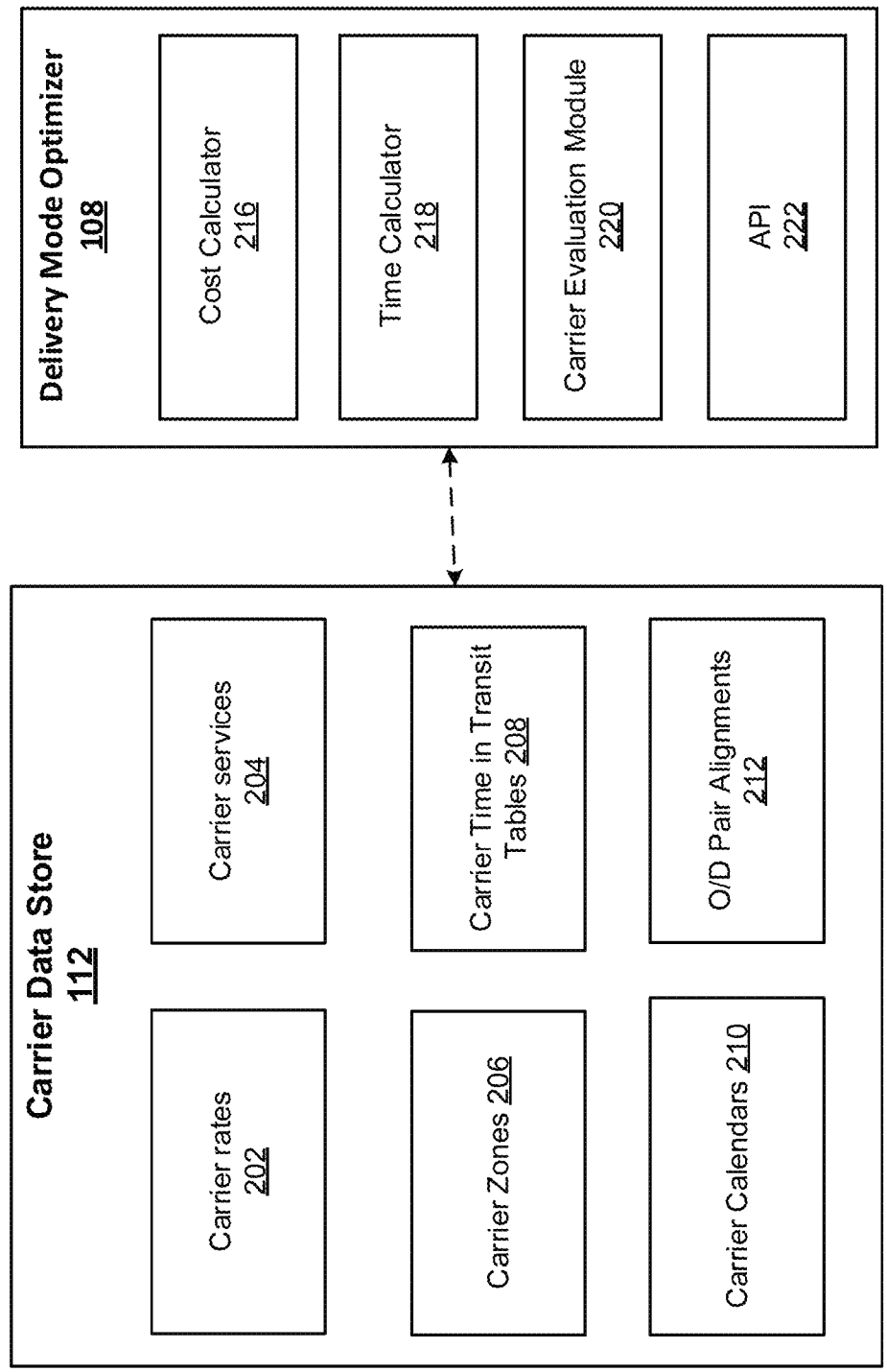
FIG. 2 illustrates a more detailed schematic diagram of the carrier data store and delivery mode optimizer of FIG. 1.

FIG. 2 illustrates a more detailed schematic diagram of the carrier data store 112 and delivery mode optimizer 108. The carrier data store 112 includes carrier rates 202, carrier services 204, carrier zones 206, carrier time in transit tables 208, carrier calendars 210, and origin/destination (O/D) pair alignments 212. The carrier data store 112 can be populated with information provided directly by the carriers. In some embodiments, carrier information is gathered by the retailer and populated into the database. This can be input manually or gathered automatically using software to automate the process. In some embodiments, carrier data is gathered by a third party provider.

Carrier rates 202 provide prices for transporting packages from an origin to the destination. The prices can vary based on distance and speed of shipping. The speed of shipping is defined by the service type. The distance is determined based on zip codes and carrier zones. Carrier rates can be defined by individual packages based on weight. In some instances, carrier rates can be provided for bulk shipments based on number of packages or overall weight of a shipment.

Carrier services 204 refer to different types and speeds of shipping. Domestic carriers offer different types of service by truck or air. The speed of service depends on the distance and type of vehicle used. For example, a shipment could be made as soon as the same day for a higher price. The shipment could travel by plane and truck to arrive at its destination within a defined geographic area. The speed of service could provide for delivery within minutes, hours, or days of an order being placed. In some embodiments, a customer can select from possible delivery speeds. Some local shipments can be made within an hour, two hours, four hours, eight hours, twelve hours, or 24 hours. Local shipments may be completed by contract services or crowd-sourced delivery. Often for a shipment to travel to another state within the same day or even the next day, air travel is required to transport packages. Such deliveries could be made within 12 hours, 24 hours, 48 hours, or longer. Other services are less costly, but take longer. For instance, some ground transport options deliver packages via truck or van and can take up to 10 business days. Other ground transport options could provide for delivery within 7 business days, within 5 business days, within 3 business days, or within 2 business days. Various other options are available that can be weighed for speed versus cost.

Carrier zones 206 are used to determine the cost of shipping from one geographic area to another. Carrier zones can be defined by the origin location or the destination location. The location can be defined by its zip code. The distance between origin and destination defines the zones.

Carrier time in transit tables 208 define the time it is expected to take to deliver a shipment from an origin to a destination. In some instances, this is based on the time of travel from one zip code to another. The time in transit tables differ based on the carrier service used.

Carrier calendars 210 define the days of operation of a given carrier. This can include holidays in which the carrier is not operating. The calendar can differ based on the level of service. For example, critical express services might operate on holidays but discount ground services might not. The carrier calendars 210 define the days of operation throughout the year for each carrier and service type.

The carrier calendars 210 also provide pick-up times and cut-off schedules. Pick-up times are defined times that a particular carrier is scheduled to pick-up packages at a particular node. Cut-off schedules are defined times that determine the latest a package can be assigned to a particular carrier to be included in the next pick-up.

Origin/Destination pair alignments 212 refer to predetermined routes that extend between an origin location and a destination location.

The delivery mode optimizer 108 includes a cost calculator 216, a time calculator 218, a carrier evaluation module 220, and an API 222.

The cost calculator 216 utilizes the carrier rates 202, carrier services 204, and carrier zones 206 to calculate an overall shipping cost for an order. In some embodiments, the cost calculator 216 also utilizes information regarding package weight, dimensions, and contents to determine the cost of shipping. The weight and dimensions of a package can be provided by the cartonization engine 118. The cost can be calculated for a plurality of possible nodes that could supply the items in the order. In some instances, the cost is only calculated for nodes that are within a predefined distance threshold of the destination zip code. The cost calculator 216 could calculate all possible shipping costs between nodes and the customer address.

The time calculator 218 utilizes the carrier services 204, carrier time in transit tables 208, and carrier calendars 210 to calculate an overall amount of time that a shipment is expected to take to get from a node to a customer. The time calculator 218 calculates times for multiple nodes that could supply items to a customer in fulfillment of an order. In some instances, the time is only calculated for nodes that are within a predefined distance threshold of the destination zip code.

The carrier evaluation module 220 evaluates the possible carrier options that could transport items from nodes to the customer address. The carrier evaluation module 220 takes into account the values calculated by the cost calculator 216 and time calculator 218 to determine which carriers, service types, and nodes provide the best combination of low cost and timeliness to complete the order within the designated time frame. The carrier evaluation module 220 determines the optimal shipping mode for one or more nodes.

The API 222 operates to communicate information between the delivery mode optimizer 108 and other programs. For example, the API 222 can communicate information between the delivery mode optimizer 108 and the online ordering system 104. The API 222 can also connect to a user interface, such as the retailer user interface 105.

FIG. 3 illustrates a schematic diagram 300 of an example supply chain for a retail enterprise. This is just one simplified example of a supply chain in which the present systems and methods can operate. The diagram 300 illustrates the flow of inventory from delivery optimization system 100 to customer 102. The delivery optimization system 100 assigns orders to one or more nodes 110 for fulfillment and delivery to customers 102. In practice, the supply chain could include many more nodes which could include different levels of the supply chain. Such levels can include receive centers, flow centers, and retail stores. A more detailed description of an example supply chain is provided in U.S. patent application Ser. No. 15/898,837 filed Feb. 19, 2018, which is herein incorporated by reference in its entirety.

Orders are received at the delivery optimization system 100 and then assigned to nodes and carriers as described above in FIG. 1. The delivery optimization system 100 in the simplified example of FIG. 2 can assign orders to one or more of the nodes 110. For example, a first order could include three different items. The delivery optimization system 100 could assign all three items to node 110a for fulfillment. The delivery optimization system 100 may determine that it is most cost efficient to assign two items to node 110b and 1 item to node 110c. Or the delivery optimization system 100 could even assign a first item to node 110a, a second item to node 110b, and a third item to 110c. Items assigned to the nodes 110 are picked and packaged for delivery to customers 102.

In the example of FIG. 3, an order placed by the customer 102a could be for items that are best fulfilled by the single node 110a. The order placed by customer 102b could be more efficiently fulfilled by delivering items from both 110b and 110c to the customer 102b.

It is in this general supply chain retail environment that the following systems and methods operate. While FIG. 3 describes a retail environment having generic nodes, this environment could be for a retailer having brick-and-mortar stores as well as online sales, a retailer only handling online sales, or other distribution systems that require transportation of goods. The customers could be individual people, businesses, or even other locations within the retail business.

Figure 4:
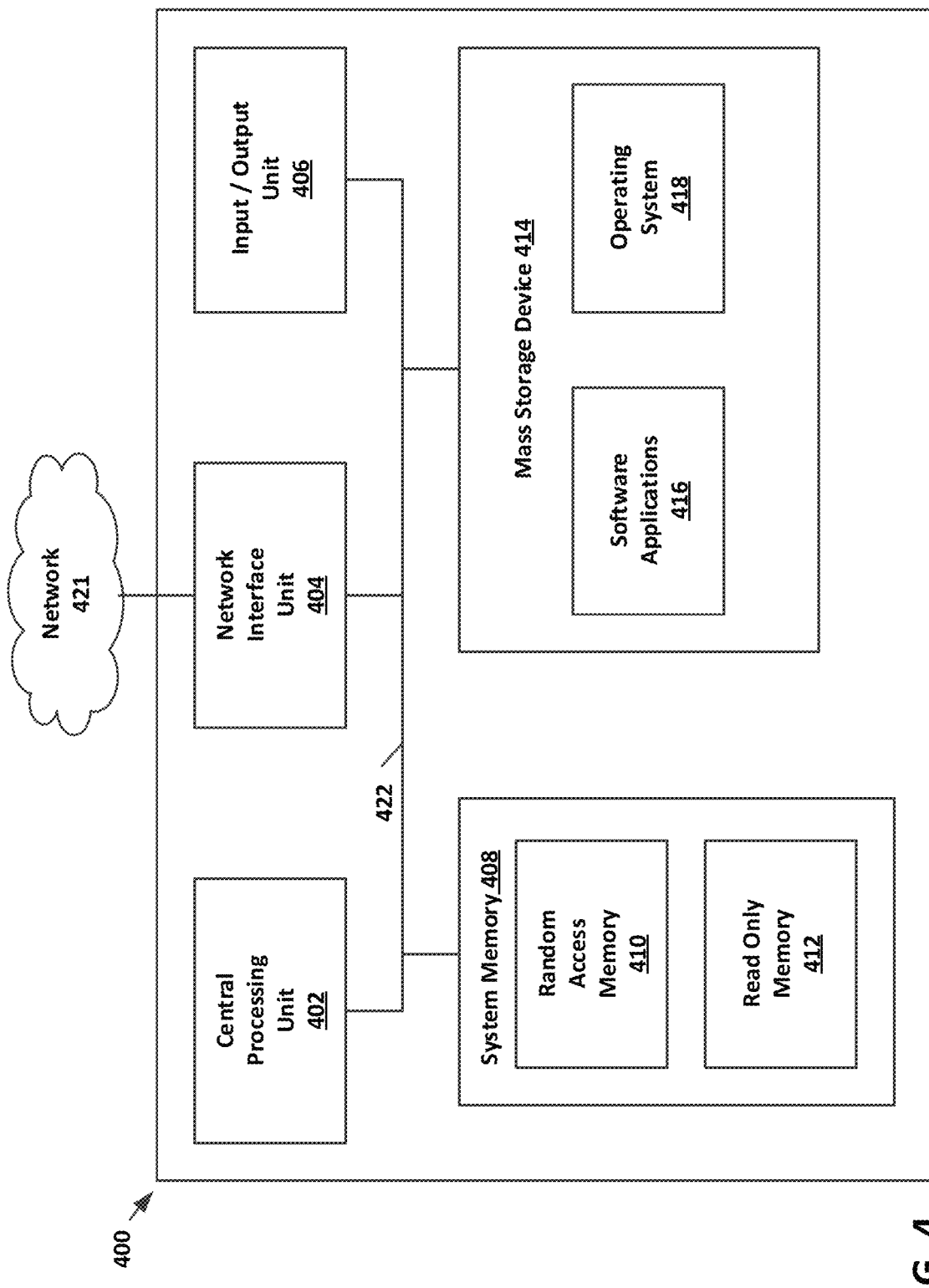
FIG. 4 illustrates an example block diagram of a computing device useable to implement aspects of the delivery optimization system of FIG. 1.

Referring now to FIG. 4, an example block diagram of a computing device 400 is shown that is useable to implement aspects of the delivery optimization system 100 of FIG. 1. For example, the computing device 400 can be used to place orders as the customer computing device 102.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 420 to receive and analyze carrier information to optimize delivery modes.

Figure 5:
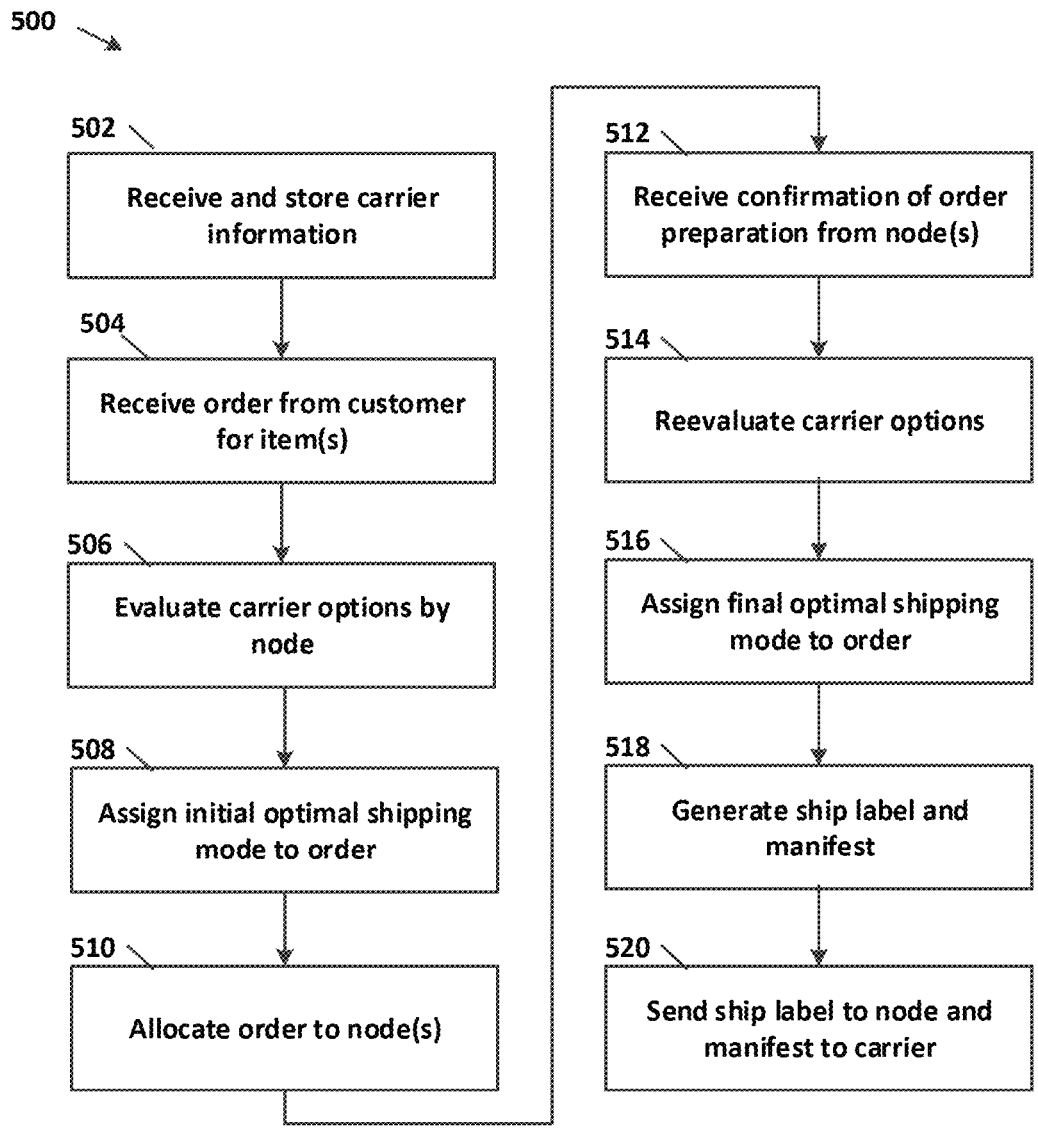
FIG. 5 illustrates a flow diagram of an example method of optimizing delivery of orders to customers.

Referring now to FIG. 5, a method of optimizing delivery of orders is described.

At operation 502, carrier information is received and stored. In some embodiments, carrier information is received directly from one or more carriers. In other embodiments, a third party service gathers information about the carriers. The carrier information is stored in a carrier data store 112. The carrier information can include some or all of the following: carrier rates 202, carrier services 204, carrier zones 206, carrier time in transit tables 208, carrier calendars 210, and O/D pair alignments 212.

At operation 504, an order is received from a customer for one or more items. The customer order can be placed on a customer computing device 102 through a customer user interface 103. The order can be for a single item, multiple different items, or multiple of the same item. In some embodiments, the customer can select a desired shipping speed. The desired shipping speed could provide for delivery within minutes, hours, or days. In some embodiments, the customer will pay more for expedited shipping. In some aspects, the customer will be offered free shipping depending on the speed selected.

The item descriptions, quantities, delivery address, and desired shipping speed are extracted from the orders at the online ordering system 104. This information is forwarded to the delivery mode optimizer 108.

At operation 506, carrier options are evaluated by node. The delivery mode optimizer 108 receives the order information and accesses the carrier data store 112 to analyze carrier information. The cost calculator 216 evaluates the cost of shipping from one or more nodes to the customer address. The time calculator 218 evaluates the time required for shipping from one or more nodes to the customer address. Both calculators take into account different carriers, shipping types, and shipping speeds. The carrier evaluation module 220 analyzes the costs and times calculated by the cost calculator 216 and time calculator 218 to determine initial optimal delivery modes available for one or more nodes.

At operation 508, an initial optimal shipping mode is assigned to the order. The initial optimal shipping mode may differ depending on the node. In some aspects, more than one node will be utilized to fulfill the order. Multiple initial optimal shipping mode options may be generated for multiple nodes at this point.

At operation 510, the order is allocated to one or more nodes in the supply chain. The order allocator 106 receives the initial optimal shipping mode options from the delivery mode optimizer 108. Based on this initial optimal shipping mode and other factors, the order allocator 106 determines which node or nodes will fulfill the order. Other factors considered include item availability at the nodes, node success rates, and shipping schedules at the nodes. Once the order is allocated to one or more nodes, the order information is sent to the selected node(s).

At the node, the order is picked and packed. Picking involves selecting the items requested in the order from storage or a sales floor within a retail store. Numbering systems can be utilized to locate items in large warehouses. Packing involves placing the items in packaging for shipment. In some embodiments, a cartonization engine 118 supplies recommendations of type and size of packages to use for packing. The cartonization engine 118 can also recommend methods of packing items in the selected packages.

The delivery mode optimizer 108 can be accessed to determine whether picking and packing a particular order could be expedited to enable a less costly shipping method to be utilized. For example, a first order could be packaged for transport by a local carrier to a destination. A second order is to be transported to a destination along the local carrier's route. If the second order is expedited for packaging, it could be included with the local carrier's pickup to reduce costs.

At operation 512, confirmation of order preparation is received from the one or more nodes. The confirmation is received at the delivery mode optimizer 108. The confirmation includes a request to reevaluate delivery modes.

At operation 514, the carrier options are reevaluated. Using the same methods as before, the delivery mode optimizer 108 analyzes the carrier information. The analysis is updated based on any changes that have occurred between the time the order was first received and processed and the time that the order was prepared for shipment. In some instances, the order will be prepared in more or less time than expected and the available shipping options will be different.

As discussed above, the order preparation could have taken less time, allowing for a slower, less expensive shipping method to be used. Alternatively, the order preparation could have taken more time than expected, requiring a faster, more expensive shipping method to be used to deliver the order by the requested time.

At operation 516, a final optimal shipping mode is assigned to the order. The delivery mode optimizer 108 determines if the initial optimal shipping mode should be changed. If so, a different final optimal shipping mode is assigned and communicated to the node where the order was prepared for shipment.

At operation 518, a ship label and manifest for the order is generated. The ship label and manifest generator 114 generates the ship label and manifest. The ship label reflects the final optimal shipping mode.

At operation 520, the ship label and manifest are sent. The ship label is sent to the node for application to the package containing the ordered items. In some instances, there will be multiple ship labels for multiple packages in order to complete an order. The ship label and manifest generator 114 sends the manifest to the carrier or carriers that will transport items from the one or more nodes to the customer. The manifest can include information for multiple orders that will be picked up from the same node.

The carrier(s) will then pick up the packages containing the ordered items and transport them to the specified address. If all goes as planned, the customer will receive the items within the timeframe requested when placing the order. In some embodiments, packages are routed through a sort facility before being transported to a final destination.

Referring now to FIG. 6, example views of a GUI are displayed. The GUI displays information that could be viewed on a computing device to view shipping status. In this example, a delay in preparing the order causes the optimal shipping mode to change in order to comply with the promised delivery date to the customer.

View 602 shows order information for an incoming customer order. The information displayed includes an order date (Jul. 21, 2018) and the zip code of the delivery destination (55410). The delivery promise date (Jul. 30, 2018) is provided along with a list of the items in the order.

View 604 shows the initial optimal delivery mode selected for the order. The order has been allocated to Node A. UPS has been selected as the carrier with Ground as the service type.

View 606 shows the order preparation confirmation. The order prep date indicates that the order was prepared by Jul. 28, 2018.

View 608 shows the final optimal shipping mode selected for the order. In this example, there was a delay in preparing the order compared to what was expected. The carrier has not changed, but the service type has changed to a faster service—Next Day Air. This is done to ensure that the order is sent to the customer by the promised date of Jul. 30, 2018.

Figure 7:
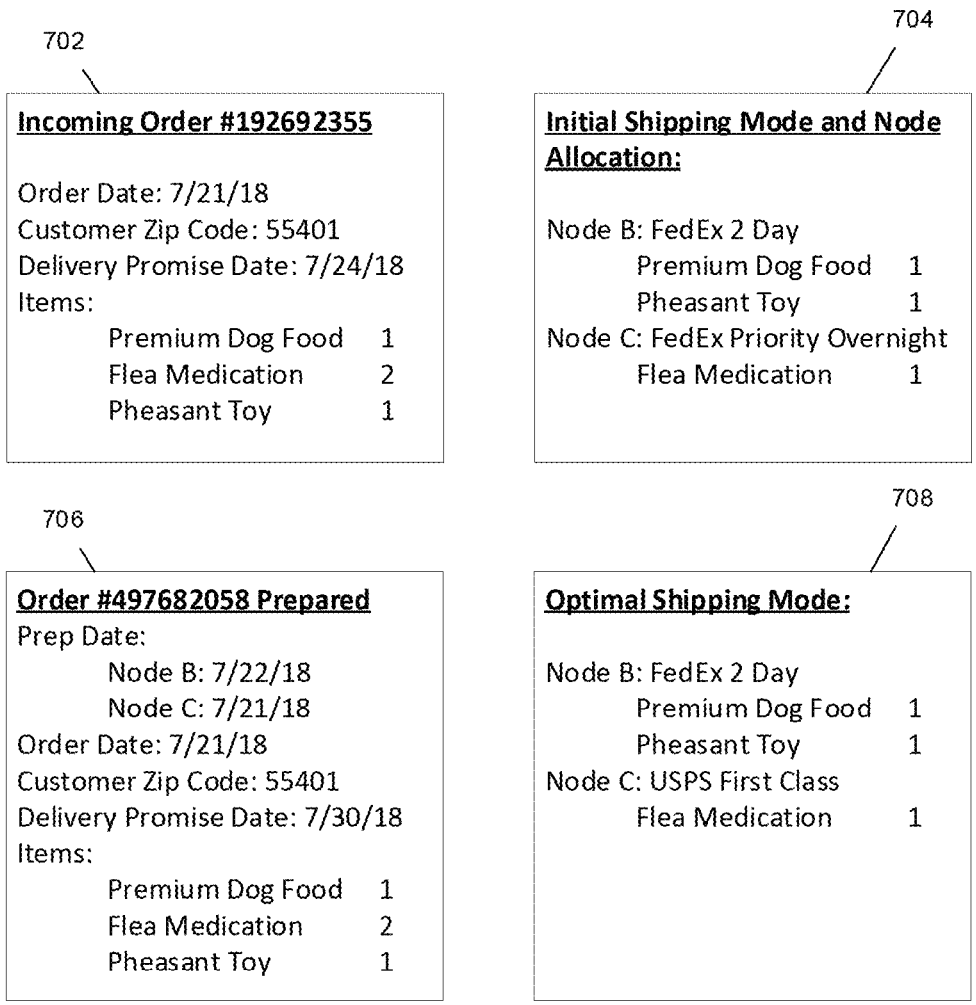
FIG. 7 illustrates additional example views of the graphical user interface of FIG. 6.

Referring now to FIG. 7, example views of a GUI are displayed. The GUI displays information that could be viewed on a computing device to view shipping status. For instance, the GUI could be the retailer GUI 105 of FIG. 1 that would be accessed by a retailer computing device by an employee. In this example, the optimal shipping mode changes because a cheaper shipping option became available between the time that the order was received and the time that the order was prepared for shipment.

The cheaper shipping option could be made available due the order being prepared for shipment in less time than expected, allowing for a slower and less expensive shipping method to be used. Alternatively, preparing the order earlier could allow for a package to be shipped along with multiple others on a schedule instead of being expedited in a separate shipment. Another option is that even if the shipment was prepared in the usual amount of time, the amount of packages that are being sent from a particular node could be enough to meet a volume minimum in order to receive a shipping discount from a particular carrier.

View 702 shows incoming order information displayed on a user interface. The incoming order information includes an order number, order date, customer zip code, and delivery promise date. The information further lists the items in the order and the quantity of each item.

View 704 displays the initial optimal shipping mode that has been selected along with the nodes to which the order has been allocated. In this example, the shipping mode is defined by the carrier (FedEx) and the service type (2 Day) for Node B. A different shipping mode is assigned to Node C.

View 706 shows the confirmation received from the node once the order has been prepared for shipment. The prep date indicates that Node B completed order prep by Jul. 22, 2018 and Node C completed order prep by Jul. 21, 2018.

View 708 shows the final optimal shipping mode selected for the order. In this example, a cheaper shipping option came available by the time the order was prepared for shipment. Node C's delivery mode changes from FedEx Priority Overnight to USPS First Class. The carrier and service type shifted to the cheapest option available to deliver the order to the customer by the promised date.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A delivery optimization system usable to select an optimal carrier and service for transporting items for inclusion on a shipping label at a time of label printing at a selected node of a supply chain, the system comprising:
 a processor executing instructions stored in a memory, the processor being caused to:
  define a plurality of components of the delivery optimization system, which includes defining:
   an online ordering system;
   a customer user interface in communication with the online ordering system;
   a retailer user interface, that is distinct from the customer user interface, the retailer user interface in communication with the online ordering system;
   a delivery mode optimizer comprising a cost calculator, a carrier evaluation module, and a time calculator;
   an order allocator, a cartonization engine, a pick and pack engine, and a ship label manifest generator, each of which is in communication with the delivery mode optimizer;
  a node success rate data store; and
   a carrier data store in communication with the delivery mode optimizer, wherein:
    the carrier data store is configured to receive from an external electronic resource and to store carrier information comprising carrier rates, carrier services, carrier zones, carrier time in transit tables, carrier calendars, and origin/destination pair alignments for each node within an enterprise supply chain comprising a plurality of nodes;

the node success rate data store receiving and storing determined success rates of each of the plurality of nodes based on an accuracy of past order fulfillment and based on the node readying past orders for shipment within a predetermined timeframe;

the online ordering system configured to access the carrier data store and the node success rate data store, and further configured to receive and process orders from customer computing devices;

the delivery mode optimizer configured to:
in response to receiving an order from a customer computing device via the customer user interface, determine which of one or more nodes within the enterprise supply chain is within a predefined distance threshold of a destination zip code of a customer address associated with the order and evaluate carrier options by node for each of the one or more nodes that are capable of fulfilling the order and are within the predefined distance threshold, each of the one or more nodes having an associated ship label printer;

receive, from the cost calculator, a plurality of shipping costs, each of the plurality of shipping costs being associated with one of the one or more nodes, each of the plurality of shipping costs being associated with carrier information stored in the carrier data store at the time the order is received;

receive, from the time calculator, a plurality of shipping times, each of the plurality of shipping times being associated with one of the one or more nodes, each of the plurality of shipping times being associated with carrier information stored in the carrier data store at the time the order is received;

based on the plurality of shipping costs and the plurality of shipping times and a predicted order preparation timing, generate a plurality of possible initial optimal shipping modes for each of the one or more nodes and communicate the initial optimal shipping modes to the order allocator, wherein the order allocator is in communication with each node and is configured to access data at each node within the supply chain, wherein the data comprises item availability, the determined success rates, and shipping schedules;

wherein the order allocator is further configured to evaluate the data at each node along with the initial optimal shipping modes at each node and allocate the order to a node from among the plurality of nodes within the supply chain based on a determination of which combination of node and initial optimal shipping modes fulfills the order most time and cost efficiently; and based on the order being allocated to the node, electronically communicate the order to a computing system associated with the node, the computing system being located at the node and remotely from the delivery mode optimizer;

wherein the delivery mode optimizer is further configured to:
receive, from the computing system at the node to which the order is allocated, a confirmation communication that the order is prepared for shipment;

in conjunction with receiving the confirmation communication, receive at the carrier optimization module a request to reevaluate carrier options from the computing system at the node;

in response to the request to reevaluate carrier options, reevaluate carrier options available at the node allocated to the order based on at least an updated shipping time at a time after the order is prepared for shipment, wherein the updated shipping time is based on updated carrier information stored in the carrier data store and available at the time carrier options are reevaluated for the node; and based on the reevaluation of carrier options for the node, assign a final optimal shipping mode to the order that fulfills the order from the node within a predetermined time and at minimized cost and communicate the final optimal shipping mode from the delivery mode optimizer to the ship label and manifest generator;

the ship label and manifest generator configured to:
generate a ship label consistent with the final optimal shipping mode, the ship label being specific to the node;
communicate the ship label from the ship and label manifest generator to the ship label printer at the node to which the order is allocated after reevaluation of the carrier options;
generate a manifest consistent with the items in the order; and
communicate the manifest from the ship and label manifest generator to the carrier, the manifest being consistent with the final optimal shipping mode;

the ship label printer configured to:
print a physical ship label at the node consistent with the generated ship label after the reevaluation of the carrier options available at the node, the physical ship label being attachable to the order and being scannable throughout a delivery process to update a status of the delivery process.

2. The delivery optimization system of claim 1, wherein the time after the order is prepared for shipment corresponds to a time at which the order is ready for shipment from the node to the customer according to one of a plurality of shipping modes available at the node.

3. The delivery optimization system of claim 1, wherein the initial optimal shipping mode is different from the final optimal shipping mode.

4. The delivery optimization system of claim 3, wherein the final optimal shipping mode differs from the initial optimal shipping mode based on at least one of: pick up time, cost of shipping, and transit time.

5. The delivery optimization system of claim 1, wherein the delivery mode optimizer applies a plurality of rules based on the carrier information.

6. The delivery optimization system of claim 1, wherein the order allocator additionally selects the one or more nodes based on available inventory at the node.

7. The delivery optimization system of claim 1, wherein the order is prepared for delivery at the node from inventory at the node, and wherein generating the possible initial shipping modes occurs prior to the order being prepared for delivery.

8. The delivery optimization system of claim 1, further comprising a customer user interface configured to display ordering options on the customer computing device and receive selections of items to place an order.

9. The delivery optimization system of claim 1, further comprising a retailer user interface configured to display order status updates on a retailer computing device.

10. The delivery optimization system of claim 1, further comprising a cartonization engine configured to recommend package sizes and types for the items in the order and provide information regarding dimensions and weight of the package sizes and types.

11. The delivery optimization system of claim 1, further comprising a pick and pack engine configured to determine how preparation of order should be prioritized, where the pick and pack engine utilizes information provided by the delivery mode optimizer.

12. The delivery optimization system of claim 1, wherein the online ordering system is further configured to process requests from a customer to return one or more items and the delivery mode optimizer determines optimal shipping modes for transporting the one or more items from a customer to a retail node within the enterprise supply chain.

13. A method of optimizing selection of an optimal carrier and service for transporting items to a customer, for inclusion on a shipping label at a time of label printing at a selected node of a supply chain, the method being executed by a processor that has executed instructions to define a delivery optimization system, the defining of the delivery optimization system having included defining:
   an online ordering system;
      a customer user interface in communication with the online ordering system;
      a retailer user interface, that is distinct from the customer user interface, the retailer user interface in communication with the online ordering system;
   a delivery mode optimizer comprising a cost calculator, a carrier evaluation module, and a time calculator;
      an order allocator, a cartonization engine, a pick and pack engine, and a ship label manifest generator, each of which is in communication with the delivery mode optimizer;
   a node success rate data store; and
      a carrier data store in communication with the delivery mode optimizer, wherein the method comprises:
      receiving, from an external electronic resource carrier, carrier information for each node within an enterprise supply chain comprising a plurality of nodes;
   storing the carrier information in the carrier store;
      determining a success rate for each of the plurality of nodes based on an accuracy of past order fulfillment at the node and based on an ability of the node to ready past orders for shipment within a predetermined time frame;
      storing the determined success rate for each of the plurality of nodes in the node success rate data store;
      receiving, at the online ordering system, via the customer user interface, an order from a customer for one or more items;
      determining which of one or more nodes within the enterprise supply chain is within a predefined distance threshold of a destination zip code of the customer, each of the one or more nodes having an associated ship label printer;
      evaluating initial data at each of the one or more nodes within the predefined distance threshold, wherein the initial data comprises item availability, determined success rates received from the node success rate data store, and shipping schedules received from the carrier data store;
      in response to receiving the order, evaluating carrier options by node for each of the nodes capable of fulfilling the order and within the predefined distance threshold;
      receiving, from the cost calculator, a plurality of shipping costs, each of the plurality of shipping costs being associated with one of the nodes capable of fulfilling the order and within the predefined distance threshold, each of the plurality of shipping costs being associated with carrier information stored in the carrier data store at the time the order is received;
      receiving, from the time calculator, a plurality of shipping times, each of the plurality of shipping times being associated with one of the nodes capable of fulfilling the order and within the predefined distance threshold, each of the plurality of shipping times being associated with carrier information stored in the carrier data store at the time the order is received;
      assigning an initial optimal shipping mode to the order based on the plurality of shipping costs, the plurality of shipping times, and a predicted order preparation timing at the time the order is received for each of the nodes capable of fulfilling the order and within the predefined distance threshold;
      allocating the order to one or more nodes consistent with the initial optimal shipping mode based on a determination of which combination of one or more nodes and initial shipping modes fulfills the order most time and cost efficiently;
      based on the order being allocated to the node, electronically communicating the order to one or more computing systems, each of the one or more computing systems being associated with one of the one or more nodes, each of the one or more computing systems being located at the node with which it is associated and being remotely located from the delivery mode optimizer;
      receiving, from the confirmation of order preparation from the one or more computing systems associated with the one or more nodes to which the order is allocated, a confirmation communication that the order is prepared for shipment;
      in conjunction with receiving the confirmation communication, receiving at the carrier optimization module a request to reevaluate carrier options from the one or more computing systems associated with the one or more nodes;
      reevaluating carrier options based on an updated shipping cost and an updated shipping time at a time after the order is prepared for shipment at the one or more nodes, wherein the updated shipping cost and the updated shipping time are based on at least an updated shipping time at a time after the order is prepared for shipment, wherein the updated shipping time is based on updated carrier information stored in the carrier data store and available at the time carrier options are reevaluated for the node;
      assigning a final optimal shipping mode to the order that fulfills the order from the node within a predetermined time and at minimized cost based on the reevaluation of carrier options for the node;
      based on the final optimal shipping mode, generating, by the ship and label manifest generator, a ship label specific to the node and one or more manifests with the ship and label manifest generator;

electronically sending, from the ship and label manifest generator, ship label to the ship label printer at the node to which the order is allocated, after reevaluation of the carrier options;

printing a physical ship label at the node consistent with the generated ship label after the reevaluation of the carrier options available at the node, the physical ship label being attachable to the order and being scannable throughout a delivery process to update a status of the delivery process; and sending, from the ship and label manifest generator to one or more carriers, the manifest being consistent with the final optimal shipping mode.

14. The method of claim 13, wherein the initial optimal shipping mode is different from the final optimal shipping mode.

15. The method of claim 13, wherein the final optimal shipping mode differs from the initial optimal shipping mode based on at least one of: pick up time, cost of shipping, and transit time to customer.

16. The method of claim 13, wherein carrier information comprises carrier rates, carrier services, carrier zones, carrier time in transit tables, carrier calendars, and origin destination pair alignments.

17. The method of claim 13, wherein the carrier options include crowd-sourced delivery.

18. The method of claim 13, wherein the carrier options are evaluated by applying a plurality of rules to the carrier information to find lowest cost options that will result in the order being delivered to the customer by a promised date.

19. The method of claim 13, wherein the initial optimal shipping mode and final optimal shipping mode comprise a carrier and a service type.

20. The method of claim 13, wherein the initial optimal shipping mode differs from the final optimal shipping mode due to a minimum volume of packages being met or being not met.

21. The method of claim 13, wherein the initial optimal shipping mode differs from the final optimal shipping mode due to a carrier pick-up cut off time being met or being not met.

22. The method of claim 13, further comprising:

determining a future initial optimal shipping mode for the node based, at least in part on the final optimal shipping mode determined while reevaluating carrier options.

\* \* \* \* \*